2,775,637

PURIFICATION OF OLEFIN-CONTAINING HYDROCARBON STREAMS

William C. Lanning and Robert J. Hogan, Bartlesville, Okla., assignors to Phillips Petroleum Company, a corporation of Delaware No Drawing. Application June 23, 1953, Serial No. 363,678

17 Claims. (Cl. 260—683.15)

This invention relates to the selective removal of carbon monoxide from a hydrocarbon stream which also contains olefins. In one of its aspects the invention is concerned with the removal of carbon monoxide from an olefin-containing hydrocarbon stream without substantial reduction of the olefin content thereof employing a purification or treating agent novel for this purpose. In another aspect, the invention relates to the selective removal of carbon monoxide from an olefin-containing hydrocarbon stream at an elevated temperature in the presence of a solid treating agent but in the absence of hydrogen. In a further aspect the invention relates to a process for the polymerization of an olefin, for example, ethylene, contained in a hydrocarbon stream, also containing carbon monoxide, in the presence of a catalyst readily poisoned by carbon monoxide in which process the said carbon monoxide is selectively removed from said hydrocarbon stream, before it contacts said catalyst, using a contact mass or treating agent as described hereinafter.

Various processes in the refinery are available for the production of ethylene-rich hydrocarbon streams, but most of these streams are contaminated with impurities which have deleterious effects in the subsequent processes in which the hydrocarbon streams may be used. For example, the conversion of olefins to hydrocarbons of higher molecular weight by polymerization reactions with a catalyst of nickel oxide supported on a carrier of silica and promoted with alumina has been found to be very effective, but the nickel oxide catalyst, as described in Patent 2,581,228, issued January 1, 1952; Patent 2,381,198, issued August 7, 1945; and Patent 2,606,940, issued August 12, 1952, is readily deactivated or poisoned by small amounts of sulfur compounds, carbon monoxide, butadiene, acetylene, and the like. Unless these constituents of the feed stream are removed, the life of the nickel oxide catalyst is extremely short.

Purification of an olefin-rich stream is difficult and costly since the presence of only a small amount of one of these poisons is sufficient to cause a substantial reduction in the effectiveness of the catalyst. Carbon monoxide has been found to be one of the strongest catalyst poisons in the nickel oxide catalyzed polymerization of olefins and when present in an amount as low as 0.05 mol percent, as shown in Table I, the catalyst becomes inactive in less than one hour. At a lower concentration of 0.01 mol percent, the catalyst is found to be nearly deactivated at the end of three hours. The data shown in Table I were obtained in the polymerization of a simulated cracked gas containing 45 mol percent ethylene and 55 mol percent hydrogen at 300 p. s. i. g., 100° F., and 600 hourly space velocity over a nickel oxide catalyst supported on silica-alumina.

*Table I*

| Impurity | Ethylene Conversion, Hr. on Stream | | | | |
|---|---|---|---|---|---|
| | ½ | 1 | 2 | 3 | 4 |
| 0.2% CO | | 0 | | | |
| 0.05% CO | 30 | 0 | | | |
| 0.01% CO | 98 | 70 | 22 | 2 | |
| None | | 94 | 64 | 31 | 14 |

We have now found that the carbon monoxide impurity which is normally found in an olefin-rich hydrocarbon stream, and which poisons the nickel oxide-silica-alumina polymerization catalyst described above, can be effectively removed without substantial reduction in olefin content of said hydrocarbon stream by passage of said hydrocarbon stream in contact with a reduced alkalized iron oxide-chromium oxide treating or purification agent at an elevated temperature and pressure. This treating agent is usually employed as a hydrogenation-dehydrogenation catalyst in hydrocarbon conversion processes. A hydrogenation-dehydrogenation catalyst of a composition of 87 weight percent ferric oxide, 10 weight percent potassium hydroxide, and 3 weight percent chromic oxide, which has been reduced as herein described, has been found to be a very effective treating agent in the purification of olefin-rich hydrocarbon streams when said streams contain carbon monoxide. Another effective treating agent is obtained by such reduction of a catalyst containing 67 weight percent ferric oxide, 30 weight percent potassium hydroxide, and 3 weight percent chromic oxide. Generally, the purification or treating agent of the present invention can be prepared by mixing or grinding or promoting iron oxide with chromium oxide and incorporating therein a suitable inorganic alkalizing agent, for example, one or more of the common alkalis, e. g., oxides, hydroxides and/or salts (e. g., carbonates) of the alkalis or even alkaline earth metals. Thus, a salt which is decomposable to the oxide is ordinarily employed. In the case of the alkaline earth compounds, salts hydrolyzable to the hydroxide may be used when water is added in the process of catalyst manufacture, e. g., just prior to extrusion. Herein and in the claims the various compounds of potassium or other alkali metal are alternatives of potassium hydroxide. Also, generally, the treating agent will have a composition in weight percent as follows: 0.5–50 potassium oxide, 1–40, preferably 1–30, chromium oxide and the remainder iron oxide. Preferably, the iron oxide will constitute the preponderant proportion of the treating agent. Thus, the iron oxide is the major active constituent preferably in excess of all other constituents combined with the possible exception of a carrier. Thus a now preferred treating agent will contain approximately 65–90% iron oxide. Herein and in the claims the proportions given are with reference to the composition which according to the invention is to be reduced with hydrogen, as later described, prior to use as the treating agent. The iron oxide and chromium oxide can be combined by thermally decomposing a mixture of the nitrates, by coprecipitating the oxides, or by mixing the hydrous gels. One particularly suitable method is to thoroughly mix by co-grinding a mixture of powdered iron oxide and powdered chromium oxide. This mixture is then formed into a paste by the addition of a solution containing the desired amount of potassium salt, extruded or pelleted, dried, and calcined at a temperature between 700 and 1000° C. and preferably between 800 and 950° C. According to the invention the treating agent composition described is reduced with hydrogen at an elevated reducing temperature, for example, in the range 650 to about 1000° F. In a preferred embodiment of the invention the composition is subjected to the reducing conditions for a period of at least four hours.

The iron oxide can be prepared by calcining a precipitated iron oxide in the form of a powder at an elevated temperature, for example in the range 1475–1600° F. until its surface area has been reduced to below about 8 square meters per gram or until its density is equivalent to about 250 pounds per barrel. At this stage the iron oxide is of a brownish-red color and has a formula of $Fe_2O_3$. Further, calcination may be effected under reducing conditions in which event the iron oxide will be partly or completely in the form of black $Fe_3O_4$. Since the treating agent according to this invention is reduced at an elevated reducing temperature prior to use, the iron therein will be essentially in the form of elemental iron although there may be present some incompletely reduced iron oxide.

Although the olefin rich-feed stream can contain hydrogen, the reaction involved is not believed to be hydrogenation of CO to form methane but the formation of iron carbide by the reaction of the CO with the iron in the treating agent or purification mass. Hydrogen need not be employed in the process of the invention and is, therefore, preferably omitted or absent.

Thus, according to this invention, there is provided a process for the selective removal of carbon monoxide from an olefin-containing hydrocarbon stream without substantial reduction in the olefin content of said hydrocarbon stream by passing the carbon monoxide-contaminated olefin-rich hydrocarbon stream, which need not contain hydrogen, preferably under the following conditions: at a temperature in the range of 300–680° F., a pressure in the range of 100–1000 p. s. i. g., and a space velocity of 500–2000 volumes of gas per volume of treating agent per hour, into contact with an alkalized iron oxide-chromium oxide purification agent, which has previously been reduced in hydrogen.

Owing to the nature of the reactions involved in the process of my invention, the process conditions, particularly temperature, cannot be definitely stated. Normally, a temperature of at least 300° F. is necessary for the reactions to take place with the upper temperature limited to about 680° F. at which the destruction of olefin hydrocarbons begins. The exact temperatures to be employed depend on the carbon monoxide content of the feed stream and the degree of carbon monoxide removal desired. The skilled operator can determine the precise desired conditions for each charge stock and catalyst, upon a perusal of this disclosure. For example, the temperature range used when treating a feed stream containing 0.08 mol percent carbon monoxide is about 380–680° F. but a preferred range of about 410–650° F. is used for a stream containing 1.2 mol percent carbon monoxide. A space velocity of about 500–2000 volumes of gas per volume of treating agent per hour can be used, but a space velocity of about 600–1000 is usually preferred. The purification treatment is more effective under superatmospheric pressure of from 100 to about 1000 p. s. i. g. and preferably in the range of about 300 to about 500 p. s. i. g. Before use, the purification agent, of particle size preferably in the range of 6–12 mesh, is reduced, as described. During a preferred reduction, the temperature is raised to 1000° F. over a period of about four hours and then maintained at that temperature for two hours.

The purification process is carried out at conditions within the above ranges in conventional apparatus for contacting gaseous streams with solids. When employing the purification agent of my invention, the carbon monoxide content of an olefin-rich hydrocarbon stream can be reduced to about 0.004 mol percent without substantial destruction of olefin hydrocarbons. Other iron-containing purification agents have been suggested for the removal of carbon monoxide from ethylene-containing streams, but the use of these agents usually results in excessive destruction of olefin hydrocarbons. See Table II below.

A purification agent having a composition of 87 weight percent ferric oxide, 10 weight percent potassium hydroxide, and 3 weight percent chromic oxide was compared with an iron-potassium and with an iron-chromium treating agent for effectiveness in the removal of carbon monoxide from thermally cracked gas of the following typical composition:

| Component | Mol Percent |
| --- | --- |
| Hydrogen | 10.8 |
| Methane | 39.7 |
| Ethane | 9.8 |
| Ethylene | 25.8 |
| Propane | 0.7 |
| Propylene | 11.4 |
| Butane and Butenes | 1.4 |
| Butadiene | 0.3 |
| Acetylene | 0.04–0.12 |
| Carbon Monoxide | 0.02 |

The carbon monoxide of this gas varied between 0.004 and 0.08 mol percent.

The additional treating agents were prepared by precipitating hydrous ferric oxide with ammonium hydroxide from an aqueous ferric nitrate solution. Chromic acid was added to one portion of the washed gel and potassium carbonate was added to the other portion. The materials were then dried, calcined at 1000° F., formed into ⅛ inch pellets, and reduced with hydrogen. The composition of the iron-potassium treating agent prior to reduction was 85 weight percent ferric oxide and 15 weight percent potassium carbonate, and the composition of the iron-chromium treating agent prior to reduction was 98 weight percent ferric oxide and 2 weight percent chromic oxide.

In runs to demonstrate the non-selectivity of iron-containing purification agents, as compared with the treating agents of the present invention, a thermally cracked gas containing carbon monoxide was contacted with the said treating agents at a space velocity of 800 volumes of gas per volume of treating agent per hour in an isothermal reactor maintained at 400 p. s. i. g.

In Table II, the selectivity of the reduced alkalized iron oxide-chromium oxide treating agent is compared with the selectivity of some other reduced iron-containing treating agents. The superiority of the treating agent of the invention is immediately apparent.

*Table II*

| Treating Agent | Temp., °F. | Olefin Loss, Volume Percent |
| --- | --- | --- |
| Alkalized Iron oxide-Chromium oxide | 300 | 1.9 |
|  | 400 | 1.9 |
|  | 490 | 1.9 |
| Iron-Potassium | 250 | 2.6 |
|  | 300 | 5.4 |
|  | 335 | 7.5 |
| Iron-Chromium | 250 | 1.0 |
|  | 300 | 2.3 |
|  | 350 | 2.6 |
|  | 400 | 8.6 |

The results given in Table III show that at lower temperatures the removal of carbon monoxide is related to the concentration of carbon monoxide in the stream to be treated. The olefin loss in these runs was 1.9 volume percent of the olefins in the feed stream.

Table III

| Temp., °F. | CO in Feed, Mol Percent | CO in Effluent, Mol Percent | CO Removal, Percent |
|---|---|---|---|
| 392 | 0.02 | 0.004 | 80 |
|  | 0.08 | 0.02 | 75 |
|  | 1.2 | 0.075 | 93 |
| 425 | 0.02 | 0.004 | 80 |
|  | 0.08 | 0.004 | 95 |
|  | 1.2 | 0.004 | 99 |

In a run with a hydrogen-free feed stream containing 0.09 volume percent carbon monoxide in a mixture of 50 volume percent ethane and 50 volume percent ethylene using the reduced alkalized iron oxide-chromium oxide treating agent as first described, a pressure of 400 p. s. i. g., and a space velocity of 800 volumes of gas per volume of treating agent per hour, the carbon monoxide removal was found to substantially correspond with the results obtained with a thermally cracked gas containing 0.08 mol percent carbon monoxide. Thus, at 388° F. the treated ethylene-rich stream contained approximately 0.02 mol percent carbon monoxide and above 425° F. the carbon monoxide remaining was constant at 0.004 mol percent. In a test made at 450° F. there was shown no loss of olefin. Thus, the carbon monoxide removal, according to the invention, can be effected in the absence of hydrogen.

Reasonable variation and modification are possible within the foregoing disclosure and the appended claims to the invention, the essence of which is that in the presence of a purification agent containing preferably a major proportion of iron oxide and relatively minor proportions of each of a suitable alkalizing agent and chromic oxide, reduced in the presence of hydrogen at an elevated temperature, olefin-containing hydrocarbon streams can be treated to remove carbon monoxide therefrom, even in the absence of hydrogen, and that such removal permits the effective polymerization of said olefin in the presence of nickel oxide-silica-alumina polymerization catalyst or other catalysts which are poisoned by the said carbon monoxide if it is not removed from said streams.

We claim:

1. A process for the selective removal of carbon monoxide from an olefin-containing hydrocarbon stream without substantial reduction in the olefin content of said stream which comprises passing said stream at a temperature of at least about 300° F. into contact with an alkalized iron oxide-chromium oxide purification agent which has been reduced in hydrogen.

2. A process according to claim 1 in which there is present no appreciable amount of hydrogen in the stream when it contacts the purification agent.

3. A process for the selective removal of carbon monoxide from an olefin-containing stream of hydrocarbons which comprises passing said stream at a temperature in the approximate range 300–680° F., a pressure in the approximate range 100–1000 p. s. i. g., and a space velocity in the approximate range 500–2000 volumes of gas per volume of treating agent per hour into contact with an alkalized iron oxide-chromium oxide treating agent which has been reduced in hydrogen and recovering a stream of hydrocarbons of a reduced carbon monoxide content.

4. A process according to claim 3 wherein the temperature during the reduction is raised to a temperature at the higher end of said range over a period of several hours and then maintained at said temperature for an additional length of time.

5. A process according to claim 3 wherein the treating agent is prepared by forming a mixture containing iron oxide and chromium oxide, incorporating therein a suitable inorganic alkalizing agent; and then reducing the mass thus obtained in an atmosphere of hydrogen at an elevated temperature.

6. A process according to claim 5 in which the alkalizing agent is one of an oxide, hydroxide and carbonate of one of an alkali and an alkaline earth metal.

7. A process according to claim 5 in which the alkalizing agent is a salt of one of an alkali and an alkaline earth metal which is decomposable to the oxide by heating the treating agent.

8. A process according to claim 3 wherein the treating agent is prepared by forming a mass containing a preponderant proportion of iron oxide and chromium oxide; the mass is alkalized; the mass is calcined at a temperature of at least about 700° C; and then reduced at an elevated temperature in the presence of hydrogen.

9. A process according to claim 3 wherein the treating agent contains approximately 65–90 percent iron oxide.

10. A process according to claim 3 in which the treating agent is a hydrogenation-dehydrogenation catalyst, containing about 87 percent ferric oxide, about 10 percent potassium hydroxide, and about 3 percent chromic oxide, which has been reduced at an elevated temperature in the presence of hydrogen.

11. A process according to claim 3 in which the stream of hydrocarbons does not contain an appreciable amount of hydrogen.

12. A process for the removal of carbon monoxide from an olefin-containing stream which comprises contacting the said stream in the absence of hydrogen with a contact mass containing a preponderant proportion of iron oxide and lesser proportions of each of potassium oxide and chromic oxide at a temperature of at least about 300° F., the said mass having been reduced in hydrogen at an elevated temperature prior to use.

13. The removal of carbon monoxide from an olefin-containing hydrocarbon stream which comprises contacting said stream with a purification agent containing a preponderant proportion of iron oxide and minor proportions of each of potassium oxide and chromic oxide at an elevated temperature in the range of about 300° F. to about 680° F., in the absence of hydrogen, at a pressure of from 100 to 1000 pounds per square inch and a space velocity of about 500 to 2000 volumes of gas per volume of catalyst per hour and recovering said olefin-containing stream containing substantially all of the olefin originally contained therein but having a reduced carbon monoxide content; the said agent having been prepared by promoting iron oxide with potassium hydroxide and chromium oxide and reducing the mass ultimately obtained in the presence of hydrogen.

14. A process for the polymerization of an ethylene-containing hydrocarbon stream also containing carbon monoxide which comprises contacting said stream with a treating agent containing a preponderant proportion of iron oxide and minor proportions of each of potassium hydroxide and chromium oxide at a temperature of at least 300° F. in the absence of hydrogen and for a time sufficient to remove a substantial proportion of the carbon monoxide originally present in said stream and then polymerizing the ethylene in said stream under polymerization conditions in the presence of a catalyst which is subject to carbon monoxide poisoning, the said agent having been reduced in an atmosphere of hydrogen prior to use.

15. The removal of carbon monoxide from an olefin-containing hydrocarbon stream which comprises contacting said stream in the absence of hydrogen at a temperature of at least about 300° F. with an agent containing by weight percent 0.5–50 potassium oxide, 1–40 chromium oxide and the remainder iron oxide, the said agent having been reduced in the presence of hydrogen at an elevated temperature prior to use.

16. A process for the removal of carbon monoxide from an olefinic hydrocarbon stream containing essentially only monoolefins therein which comprises contacting the said stream in the absence of hydrogen with a contact mass containing a preponderant proportion of iron oxide and lesser proportions of each of potassium oxide and chromic oxide at a temperature of at least about 300° F., the said mass having been reduced in hydrogen at an elevated temperature prior to use.

17. A process for the polymerization of an ethylene-containing stream of hydrocarbons also containing carbon monoxide which comprises passing said stream at a temperature in the approximate range 300–680° F., a pressure in the approximate range 100–1000 p. s. i. g., and a space velocity in the approximate range 500–2000 volumes of gas per volume of treating agent per hour into contact with an alkalized iron oxide-chromium oxide treating agent which has been reduced in hydrogen, recovering a stream of hydrocarbons of a reduced carbon monoxide content and then subjecting the said recovered stream of hydrocarbons under polymerization conditions to the action of a nickel oxide-silica-alumina polymerization catalyst.

References Cited in the file of this patent

UNITED STATES PATENTS

| | | |
|---|---|---|
| 1,836,927 | Linckh et al. | Dec. 15, 1931 |
| 2,378,969 | Bailey et al. | June 26, 1945 |
| 2,426,604 | Frevel | Sept. 2, 1947 |
| 2,581,228 | Bailey et al. | Jan. 1, 1952 |